United States Patent [19]

Bertolacini et al.

[11] 4,140,626
[45] Feb. 20, 1979

[54] PROCESS FOR THE SELECTIVE DESULFURIZATION OF CRACKED NAPHTHAS WITH MAGNESIA-CONTAINING CATALYST

[75] Inventors: Ralph J. Bertolacini, Chesterton, Ind.; Trevelyan A. Sue-A-Quan, Forest Park, Ill.

[73] Assignee: Standard Oil Company (Indiana), Chicago, Ill.

[21] Appl. No.: 820,376

[22] Filed: Jul. 29, 1977

Related U.S. Application Data

[63] Continuation-in-part of Ser. No. 664,018, Mar. 4, 1976, abandoned, which is a continuation-in-part of Ser. No. 444,394, Feb. 21, 1974, abandoned.

[51] Int. Cl.² .............................................. C10G 23/02
[52] U.S. Cl. .............................. 208/216 R; 252/465; 252/468
[58] Field of Search ...................... 208/216, 255, 257

[56] References Cited

U.S. PATENT DOCUMENTS

| | | | |
|---|---|---|---|
| 2,392,579 | 1/1946 | Cole | 208/257 |
| 3,269,938 | 8/1966 | Lefrancois | 208/216 R |
| 3,475,327 | 10/1969 | Eng et al. | 208/216 R |
| 3,956,105 | 5/1976 | Conway | 208/255 |

*Primary Examiner*—George Crasanakis
*Attorney, Agent, or Firm*—James. L. Wilson; Arthur G. Gilkes; William T. McClain

[57] ABSTRACT

The process comprises contacting a cracked naphtha in a reaction zone under hydrodesulfurization conditions and in the presence of hydrogen with a catalyst comprising a hydrogenation component comprising a Group VIB metal and a Group VIII metal deposited on a solid support comprising magnesium oxide. The catalyst support may also comprise a refractory inorganic oxide, such as alumina. In the latter case, the catalyst support should contain at least 70 wt.% magnesium oxide to furnish a satisfactory embodiment of the catalyst.

35 Claims, 4 Drawing Figures

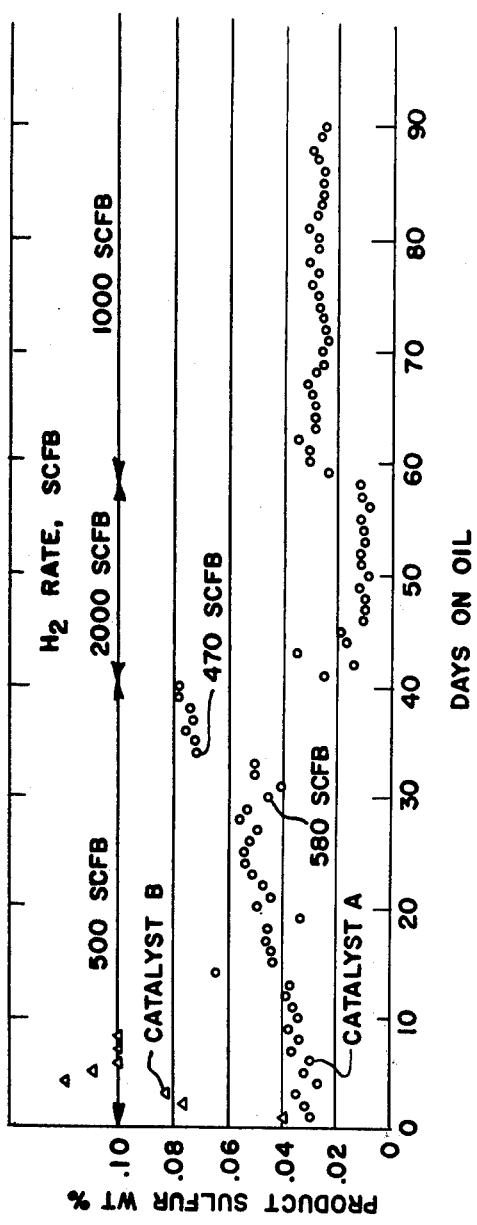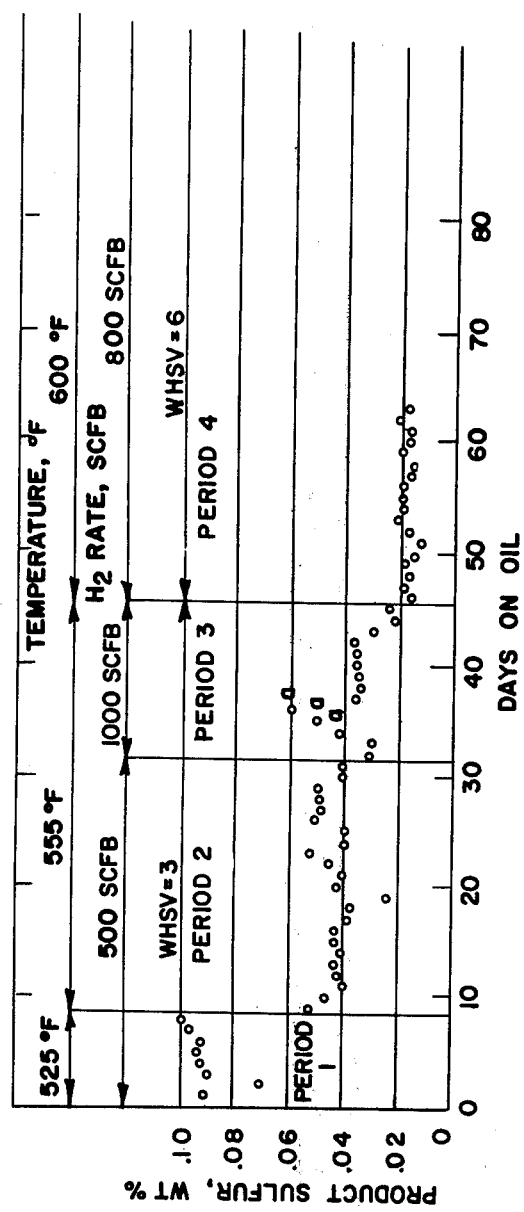
FIG. 2
RESULTS OF LIFE TEST AT 150 psig
FIG. 3
RESULTS OF LIFE TEST AT 300 psig

PROCESS FOR THE SELECTIVE DESULFURIZATION OF CRACKED NAPHTHAS WITH MAGNESIA-CONTAINING CATALYST

CROSS-REFERENCE TO RELATED APPLICATION

This application is a continuation-in-part application of co-pending application U.S. Ser. No. 664,018, which was filed in the United States Patent and Trademark Office on March 4, 1976, and is now abandoned. U.S. Ser. No. 664,018 is, in turn, a continuation-in-part application of application U.S. Ser. No. 444,394, which was filed in the United States Patent and Trademark Office on Feb. 21, 1974, and is now abandoned.

BACKGROUND OF THE INVENTION

One of the blending components to be used in a refinery gasoline pool is cracked naphtha. Cracked naphtha contains both sulfur and olefins. The sulfur, which may be present in amounts that are about 0.3 wt.% or larger, is both a potential air pollutant and a poison or toxic material to the catalysts that might be used in the catalytic muffler of an automobile engine's exhaust system. On the other hand, the olefins, which may be present in an amount of about 30 wt.% or larger, have octane numbers that are higher than those of the corresponding saturates.

Today, sulfur dioxide that is generated by the burning of high sulfur fuels has been identified as one of the chief air pollutants. Hydrodesulfurization is an important method for producing fuels with relatively low sulfur concentrations and commercial hydrodesulfurization plants for treating fuel oils are now in operation to provide fuel oils that have legally acceptable sulfur levels. At this time, maximum sulfur contents of motor fuels have not been established by the government; however, the situation is changing rapidly. Restrictions on sulfur contents of motor fuels seem inevitable. The sulfur concentrations of blending components for the refinery gasoline pool and, hence, of cracked naphtha will have to be reduced.

Therefore, if the cracked naphtha is to be desulfurized without eliminating or seriously reducing the amount of olefins that are present therein, the desulfurization process that is used must be very selective, i.e., capable of removing substantially all of the sulfur without severely saturating the olefins that are present. Currently, there are several desulfurization catalysts that find considerable use in the petroleum refining industry. Such desulfurization catalysts include cobalt and molybdenum and their compounds on a suitable support, nickel and tungsten and compounds thereof on a suitable support, and nickel and molybdenum and compounds thereof on a suitable support. The support, in general, is the non-acidic or weakly-acidic catalytically active alumina. Such conventional desulfurization catalysts are selective, that is, these catalysts not only remove sulfur from the petroleum hydrocarbon stream being treated, but also tend to restrict the saturation of olefins in that petroleum hydrocarbon stream.

It must be pointed out that while such conventional desulfurization catalysts have good selectivity, there now has been found a catalyst that provides unexpectedly better selectivity.

Cole, in U.S. Pat. No. 2,392,579, discloses a process for treating olefinic and sulfur-bearing gasolines to effect substantial desulfurization and refining. A portion of partially treated product is recycled to maintain a small concentration of olefins in the hydrogenation reaction zone to prevent to a certain extent the undesired hydrogenation of normal olefins and aromatics. Cole teaches that the catalyst employed may be any of the known conventional super-active hydrogenation catalysts and composites thereof which may or may not contain such materials as alumina, magnesia, silica, zinc oxide, chromium oxide, etc., as stabilizers, promoters, or supports. Cole requires olefin recycle and does not provide any specific examples of the catalyst of the present invention.

Haensel, in U.S. Pat. No. 2,770,578, discloses a process for treating unsaturated and sulfur-containing stocks to obtain saturated and substantially sulfur-free charge stocks for other processes, which process employs two distinct catalysts, a hydrogenation catalyst comprising platinum and/or palladium, preferably combined with a carrier of silica, alumina, zirconia, titania, activated carbon, magnesia, or combinations thereof, and a sulfur-resistant desulfurization catalyst, such as a Group VI metal and an iron group metal on a suitable support, such as those employed in the hydrogenation catalyst. Haensel teaches that the process first uses the hydrogenation catalyst to saturate the unsaturated compounds in the feedstock at a temperature which is too low to effect desulfurization and then desulfurizes the saturated, unpolymerizable stock that is produced. Haensel wants saturation of unsaturates and removal of sulfur and does not give examples of the catalyst of the present invention.

Lefrancois, in U.S. Pat. No. 3,269,938, teaches a hydrogenation process employing a catalyst comprising molybdenum and nickel on a particular support of silica-magnesia to produce a product having a lower degree of unsaturation. The Lefrancois patent teaches that the process is particularly suited for the hydrogenation of low-quality kerosene. The Lefrancois patent does not disclose a process for the desulfurization of a cracked naphtha without substantial saturation of the olefins contained in the cracked naphtha. The patent does say that the process may be used to selectively hydrogenate any diolefins present in a catalytically cracked gasoline to monoolefins.

Gislon, et al., in U.S. Pat. No. 2,853,429, disclose a desulfurization catalyst that contains a Group VI metal, a Group VIII metal, and magnesia. It does not teach, disclose, or suggest the selective desulfurization of cracked naphthas or, for that matter, the selective desulfurization of any feedstock. In Examples 4 and 6, a straight-run gas oil is employed. In Examples 5 and 7, a catalytic cycle stock, having a boiling range of 215° C. (419° F.), to 320° C. (608° F.) and a sulfur content of 1.9% sulfur, is used. Neither of these feeds are cracked naphthas, as described hereinafter. Moreover, there is no indication of the presence of olefins in either the feedstocks or the products of these examples.

Eng, et al., in U.S. Pat. No. 3,475,327, disclose a process for the hydrodesulfurization of blended feedstocks. The blended feedstocks may contain virgin or straight run naphthas, coker naphthas, steam cracked naphthas or pyrolysis gasoline, catalytic gas oils, coker gas oils, and straight run gas oils. The process of Eng, et al., comprises contacting the feedstock with a catalyst comprising a mixture of a member of the group consisting of Group VI oxides and sulfides with a member of the group consisting of iron, cobalt, and nickel oxides and sulfides deposited upon a porous carrier, such as alumina, silica-alumina, bauxite, kieselguhr, magnesia, or zirconia. Eng, et al., indicate that a preferred catalyst is cobalt molybdate on a silica-stabilized alumina. This patent limits the amount of cracked naphtha that may be present in the feed being treated by the disclosed process. It does not disclose the treatment of a feed that is one hundred percent cracked naphtha. While this patent mentions a large number of porous carriers that may be used in the catalyst, it does not provide any specific examples of the catalyst of the present invention.

Conway, in U.S. Pat. No. 3,956,105, discloses processes for the hydrotreating of various hydrocarbons and mixtures of hydrocarbons, the catalyst that is employed in such hydrotreating processes, and the method for preparing such catalyst. Conway teaches that the catalyst constitutes a Group VIB component and a Group VIII component and a porous carrier material, and may contain a halogen and/or an alkali or an alkaline earth metal. Various porous carriers are considered as the carrier for the catalyst. Conway suggests that the carrier material is a refractory inorganic oxide, either alumina in and of itself or in combination with one or more refractory inorganic oxides, and particularly in combination with silica. While magnesia is mentioned as one of the porous carrier materials available or suitable, Conway does not specifically provide in any example an exact catalytic composition of the catalyst employed in the present application.

Meyer, in U.S. Pat. No. 3,764,519, discloses processes for the hydrocracking and hydrodenitrification of hydrocarbon fractions. They employ a catalyst that comprises an alumina-silica-magnesia matrix containing a hydrogenation component and a crystalline zeolitic molecular sieve substantially free of hydrogenation components and dispersed in the alumina-silica-magnesia matrix.

The catalytic composition that is employed as the catalyst in the process of the present invention appears to be an exceptionally selective catalyst for the desulfurization of cracked naphthas.

SUMMARY OF THE INVENTION

Broadly, according to the present invention, there is provided a process for the selective desulfurization of cracked naphthas. This process comprises contacting a cracked naphtha in a reaction zone under hydrodesulfurization conditions and in the presence of hydrogen with a catalyst comprising a hydrogenation component comprising a Group VIB metal and a Group VIII metal deposited on a solid support comprising magnesium oxide. The catalyst support may also comprise a refractory inorganic oxide, which is a member selected from the group consisting of catalytically active alumina, silica-alumina, and silica. The catalyst support should contain at least 70 wt.% magnesium oxide. Preferably, the Group VIB metal is molybdenum and the Group VIII metal is cobalt, said molybdenum and said cobalt being present as a member selected from the group consisting of (1) the elements, (2) their oxides, (3) their sulfides, and (4) mixtures thereof.

The hydrodesulfurization conditions comprise a temperature of about 450° F. to about 750° F., a total pressure of about 75 psig to about 600 psig, a hydrogen-to-hydrocarbon ratio of about 200 standard cubic feet of hydrogen per barrel of hydrocarbon feed (SCFB) to about 5,000 SCFB, and a weight hourly space velocity (WHSV) of about 1 to about 15 weight units of hydrocarbon per hour per weight unit of catalyst.

BRIEF DESCRIPTION OF THE DRAWINGS

Four figures ar presented herewith.

FIG. 2 provides the results of a test representing an embodiment of the process of the present invention when conducted at a pressure of 150 psig. It also presents some comparative data obtained from a desulfurization process employing a prior-art commercially-prepared desulfurization catalyst.

FIG. 3 presents the results obtained from a test representing an embodiment of the process of the present invention when conducted at a pressure of 300 psig.

DESCRIPTION AND PREFERRED EMBODIMENTS

Figure 1:
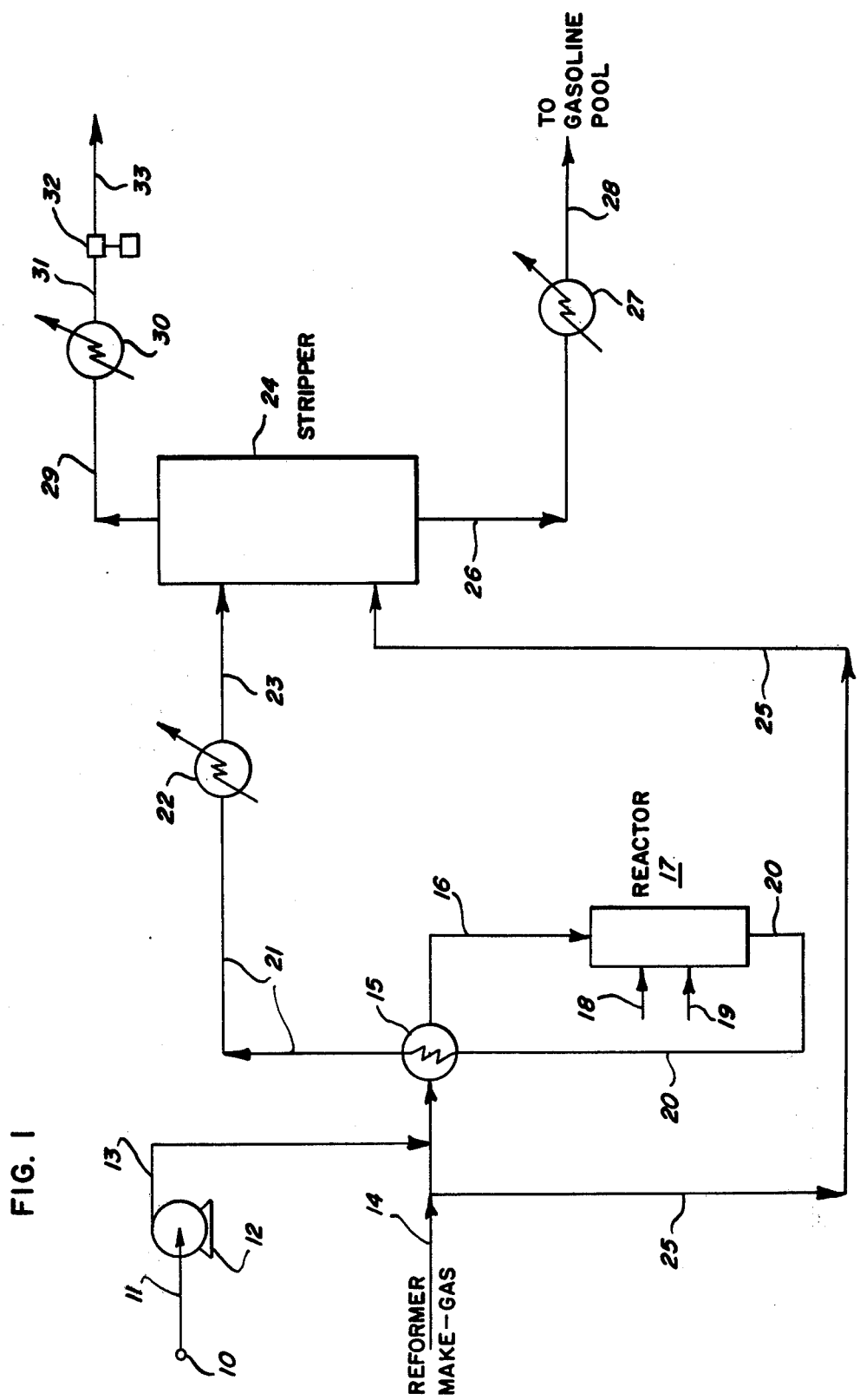
FIG. 1 represents a simplified process flow scheme of an embodiment of the process of the present invention.

Broadly, according to the present invention, there is provided a process for the selective desulfurization of cracked naphthas. This process comprises contacting a cracked naphtha in a reaction zone under hydrodesulfurization conditions and in the presence of hydrogen with a catalyst comprising a hydrogenation component comprising a Group VIB metal of the Periodic Table of Elements and a Group VIII metal of the Periodic Table of Elements deposed on a solid support comprising magnesium oxide. The Periodic Table of Elements to which this description refers is the Periodic Table that appears on page 628 of WEBSTER'S SEVENTH NEW COLLEGIATE DICTIONARY, G. and C. Merriam Company, Springfield, Mass., U.S.A., 1965.

The preferred Group VIB metal is molybdenum while the preferred Group VIII metal is cobalt. These metals are present in the catalyst as a member selected from the group consisting of (1) the elements, (2) their oxides, (3) their sulfides, and (4) mixtures thereof. The Group VIB metal of the catalytic composition that is employed in the process of the present invention is present in an amount of about 10 wt.% to about 20 wt.% and the Group VIII metal of the catalytic composition is present in an amount of about 1 wt.% to about 10 wt.%, each amount being based on the total weight of the catalyst and being calculated as the oxide of the respective metal.

The solid support of the catalytic composition that is employed in the process of the present invention is a support that comprises magnesium oxide. While the support may be solely magnesium oxide, it may also comprise a refractory inorganic oxide, such as a member selected from the group consisting of catalytically active alumina, silica-alumina, and silica. The catalytically active alumina may be gamma-alumina, eta-alumina, or mixtures thereof. Such alumina will generally have an average pore size that is greater than 70 Angstrom units and may extend up to 200 Angstrom units, or more. In addition, suitable catalytically active aluminas will have surface areas that are at least 150 square meters per gram and may extend up to surface areas that are 800 square meters per gram or larger. Silica-alumina that may be employed as the refractory inorganic oxide may be either a low-alumina silica-alumina, which has an alumina content of about 5 wt.% to about 15 wt.%, or high-alumina silica-alumina, which has an alumina content in the range of about 15 wt.% to about 40 wt.%.

When the support comprises an alumina in addition to the magnesium oxide, the catalyst support should contain at least 70 wt.% magnesium oxide, based on the weight of the support. As shown hereinafter, such a catalyst will provide satisfactory performance.

Hence, an embodiment of the proess of the present invention comprises contacting a cracked naphtha comprising paraffins, naphthenes, aromatics, and unsaturates in a reaction zone under hydrodesulfurization conditions and in the presence of hydrogen with a catalyst to furnish a product containing unsaturates and a reduced amount of sulfur, said catalyst comprising a hydrogenation component which comprises a Group VIB metal and a Group VIII metal deposed on a solid support comprising at least 70 wt.% magnesium oxide, and said Group VIB metal and said Group VIII metal being present as a member selected from the group consisting of (1) the elements, (2) their oxides, (3) their sulfides, and (4) mixtures thereof. The support may comprise from 70 wt.% magnesium oxide to substantially all magnesium oxide. Of course, the support may be 100 wt.% magnesium oxide.

The catalytic composition that is employed in the process of the present invention may be prepared by impregnating magnesium oxide with the heat-decomposable compounds of the hydrogenation metals. In general, either a solution containing both metals or a solution containing one of the metals to be impregnated on the support, followed by a solution containing the other metal, may be employed. In the event that the support material is a combination or mixture of the magnesium oxide and a refractory inorganic oxide, the support material may be prepared by suitable conventional methods for making catalytic supports containing one or more components and the resultant support may then be impregnated with the desired solution or solutions. In either case, the impregnated support material is then dried in air at a temperature of about 250° F. for a period of 1 to 20 hours and the dried material is subsequently calcined at a temperature of about 700° F. to about 1,100° F., preferably, about 800° F. to about 1,000° F., for a period of from about 1.5 to about 10 hours. A convenient rate of air that may be employed during such drying and calcination is an air rate of about 1.5 cubic feet per hour, although other air rates may be conveniently used. Alternatively, a blend of magnesium oxide powder, aqueous solutions of compounds of the hydrogenation metals, and sol alumina can be prepared and the resultant blend can be dried, ground to a finely divided material, pelleted to an appropriate size, and calcined. Conditions employed for the drying may be as listed above, while the calcination may be carried out as above or by calcining the pellets for at least 1 to 2 hours at a temperature as low as 450° F., gradually increasing the temperature to a temperature that approaches 1,000° F. to 1,100° F. and maintaining such higher temperature for several hours.

The hydrodesulfurization conditions that are employed during the process of the present invention comprise the following conditions: a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst. Preferred hydrodesulfurization conditions comprise a temperature of about 525° F. to about 700° F., a total pressure of about 150 psig to about 400 psig, a hydrogen-to-hydrocarbon ratio of about 300 SCFB to about 2,000 SCFB, and a WHSV of about 3 to 10 weight units of hydrocarbon per hour per weight unit of catalyst.

It is beneficial for the proper maintenance of selectivity that the process conditions be regulated so that total vaporization of the reactants and products is present in the reaction zone. Moreover, the hydrogen partial pressure should be at least 60 psia; preferably, the hydrogen partial pressure should be at least 80 psia.

Typical feedstocks that may be employed in the process of the present invention include catalytically-cracked naphthas and coker naphthas. Such feedstocks not only contain paraffins, naphthenes, and aromatics, but also unsaturates, such as open-chain and cyclic olefins, diolefins, and cyclic hydrocarbons with olefinic side chains. Such feedstocks generally have a boiling range of about 120° F. to about 400° F., and may have a maximum boiling temperature of about 445° F. Cracked naphthas generally contain from about 0.2 wt.% sulfur to about 0.4 wt.% sulfur and up to about 20 to 80 ppm of nitrogen. Coker naphthas may contain up to about 1 wt.% sulfur and up to about 100 ppm nitrogen.

A simplified schematic flow diagram of an embodiment of the process of the present invention is presented in accompanying FIG. 1. This embodiment and the following experimental examples are presented for purposes of illustration only and are not intended to limit the scope of the present invention.

The process flow scheme represented in accompanying FIG. 1 is a simplified process scheme and does not show various pieces of auxiliary equipment, such as valves, certain heat exchangers, pumps and compressors. Those skilled in the art would recognize the need and location of such auxiliary equipment and, hence, such equipment is not presented.

Referring now to accompanying FIG. 1, stabilized heavy naphtha (SHN) is obtained from source 10 and is passed through line 11 into pump 12 to be pumped through line 13. Reformer make-gas is passed through line 14. The SHN in line 13 is introduced into line 14 to be mixed with the reformer make-gas. The mixed reformer-make-gas SHN stream is then passed through heat exchanger 15 to be heated to the temperature being employed in the reactor, such heating being accomplished by heat exchange with reactor effluent. The heat mixed reformer-make-gas SHN stream is then passed through line 16 into the top of reactor 17.

Reactor 17 contains one or more beds of a catalytic composition comprising 1 to 10 wt.% cobalt oxide and 10 to 20 wt.% molybdenum trioxide on a support of magnesium oxide. Please note that an external heat source (not shown) would be required to start the reaction. In addition, since some olefin hydrogenation will occur, there will probably be a 75° F. to 100° F. temperature rise across the reactor. Such phenomenon will require special instrumentation or a hydrogen quench to avoid run-away reaction temperatures. If needed, hydrogen quench may be obtained from lines 18 and 19.

The effluent from reactor 17 is passed through line 20 to heat exchanger 15, where it is cooled, and then through line 21 into condenser 22. The cooled effluent is then passed through line 23 into stripper 24. Stripping may be accomplished by using reformer make-gas from line 25. While this arrangement is preferred, a reboiled stripper could be used. Stripper 24 is employed to remove hydrogen sulfide from the product. The liquid product is withdrawn from stripper 24 by way of line 26 to be cooled in condenser 27 and then sent through line 28 to the gasoline pool. The overhead from stripper 24 is removed by way of line 29. This overhead contains from about 0.2 to about 2 mole % hydrogen sulfide. The overhead is cooled in condenser 30 and then sent by way of line 31 to be recompressed in compressor 32. The recompressed gas is then sent by way of line 33 for reuse or for discharge to fuel.

An embodiment of the process of the present invention is a process for the selective desulfurization of cracked naphthas, which process consists essentially of contacting a cracked naphtha comprising paraffins, naphthenes, aromatics, and unsaturates in a reaction zone under hydrodesulfurization conditions and in the presence of hydrogen with a catalyst to furnish a product containing unsaturates and a reduced amount of sulfur, said catalyst comprising a hydrogenation component which comprises a Group VIB metal and a Group VIII metal deposed on a solid support comprising at least 70 wt.% magnesium oxide, and said Group VIB metal and said Group VIII metal being present as a member selected from the group consisting of (1) the elements, (2) their oxides, (3) their sulfides, and (4) mixtures thereof. The catalyst support may also contain a refractory inorganic oxide, such as alumina. Preferably, the support contains at least 86 wt.% magnesium oxide.

EXAMPLE I

An embodiment of the catalyst employed in the process of the present invention was prepared. A 164-gram portion of powdered MgO (reagent grade) obtained from the Baker Chemical Company was impregnated with 150 ml. of an aqueous solution that had been prepared by dissolving 36.3 grams of ammonium molybdate in 100 ml. of hot distilled water (about 160° F.) and 23.3 grams of cobaltous nitrate in 50 ml. of distilled water, followed by mixing the two solutions. The impregnated material was then dried in air at 250° F. for 3 hours, pelleted into ⅛-inch pellets (employing 4% Sterotex), and calcined in air for 3 hours at a temperature of 1,000° F. During both the drying and calcination of this material, an air flow rate of about 1.5 cubic feet per hour was employed. This catalyst, identified hereinafter as Catalyst A, contained 3.1 wt.% cobalt oxide and 16.1 wt.% molybdenum trioxide, based on the weight of the catalytic composition.

EXAMPLE II

Catalyst A was tested for its ability to desulfurize a cracked naphtha, hereinafter identified as Feedstock No. 1. The test was conducted in a bench-scale test unit. This test unit employed a reactor having a ⅜-inch diameter. The reactor was immersed in a molten salt bath.

During each day, a 2-hour sample of the product was collected from a condenser that was being cooled with a dry-ice-acetone mixture. The product was subsequently washed with cadmium sulfate solution to remove hydrogen sulfide and was then analyzed for sulfur and for its bromine number. The change in bromine number was used as the measure of olefin saturation. In addition, product octane numbers were measured periodically.

For this test, a 13.1-gram portion of Catalyst A, in the form of particles that would pass through a 12-mesh screen (U.S. Sieve Series) but would be retained on a 20-mesh screen, was charged to the reactor. The catalyst sample was presulfided with a mixture of 8 vol. % hydrogen sulfide in hydrogen. This presulfiding treatment took place for 1 hour at atmospheric pressure, a temperature of 565° F., and a gas flow rate of 1 cubic foot per hour.

The properties of Feedstock No. 1, which was employed in this test, are presented in Table 1.

Table 1

| Feedstock Properties | | |
|---|---|---|
| Feedstock No. | 1 | 2 |
| Gravity, ° API | 48.6 | 49.4 |
| Sulfur, wt.% | 0.27 | 0.195 |
| Bromine No., cg./g. | 51 | 74.5 |
| Nitrogen, ppm | 54 | 76 |
| Octane No. | | |
|   Unleaded Motor | 77.6 | 80.1 |
|   Unleaded Research | 89.3 | 93.5 |
| ASTM Distillation, ° F. | | |
|   IBP | 117 | 143 |
|   10% | 173 | 200 |
|   30% | 230 | 241 |
|   50% | 280 | 270 |
|   70% | 330 | 295 |
|   90% | 395 | 328 |
|   EBP | 433 | 387 |
| FIA, Vol. % | | |
|   Saturates | 36.0 | 21.5 |
|   Olefins | 30.5 | 43.0 |
|   Aromatics | 33.5 | 35.5 |

The actual desulfurization test, hereinafter identified as Test No. 1, was conducted at a pressure of 150 psig, a temperature of 575° F., a WHSV of 3 weight units of hydrocarbon per hour per weight unit of catalyst, and a hydrogen rate of about 500 SCFB. At 41 days on oil, the hydrogen rate was changed to about 2,000 SCFB; at 59 days on oil, the hydrogen rate was reduced to about 1,000 SCFB. In addition, during the period from 27 days to 33 days on oil, the hydrogen rate was raised from about 500 SCFB and maintained at a rate of about 580 SCFB. This was followed by a reduced hydrogen rate of about 470 SCFB until 41 days on oil.

The results of Test No. 1 are presented in FIG. 2 and are represented by the circles. Desulfurization was expressed in terms of product sulfur concentration. Initially, the catalyst began to deactivate at a hydrogen rate of about 500 SCFB, as shown by the rise in product sulfur concentration. At 27 days on oil, when the hydrogen rate was increased to about 580 SCFB, the product sulfur concentration leveled off. When the hydrogen rate was reduced to 470 SCFB, there resulted a sharp increase in product sulfur concentration. Subsequently, the increase in hydrogen rate to 2,000 SCFB produced a sharp decrease in product sulfur concentration. When the hydrogen rate was decreased to 1,000 SCFB, the product sulfur concentration increased somewhat, but there was no appreciable deactivation of the catalyst during the period extending from 59 days on oil through 90 days on oil.

The average initial desulfurization obtained with Catalyst A over the first 8 days on oil amounted to 88.1 wt.%, while the average olefin saturation was 36.5 wt.%. The individual values for the desulfurization and olefin saturation during these eight days are presented in Table II.

Table II
Data Obtained with Catalyst A During First Eight Days of Test No. 1

| Days on Oil | Desulfurization, wt. % | Olefin Saturation, wt. % |
|---|---|---|
| 1 | 88.9 | 42.4 |
| 2 | 88.1 | 38.9 |
| 3 | 87.0 | 36.9 |
| 4 | 90.0 | 37.6 |
| 5 | 88.1 | 37.6 |
| 6 | 88.9 | 34.7 |
| 7 | 86.7 | 38.6 |
| 8 | 87.4 | 25.3 |
| Average | 88.1 | 36.5 |

Data obtained at various times during Test No. 1 are presented in Table III hereinbelow. In addition to the values for the wt.% desulfurization and wt.% olefin saturation are presented values for Δ octane number, which is the difference in the octane number of the desulfurized product and that of the feedstock. If the octane number of the product were lower than that of the feed, a "minus" Δ octane number is shown; if the octane number of the product were greater than that of the feed, a "plus" Δ octane number is given. The data from Test No. 1 presented in Table III were obtained from samples taken while the reactants and products were believed to be substantially completely vaporized.

Table IV
Data Obtained with Catalyst B During First Eight Days of Test No. 2

| Days on Oil | Desulfurization, wt. % | Olefin Saturation, wt. % |
|---|---|---|
| 1 | 85.2 | 34.9 |
| 2 | 71.5 | 33.9 |
| 3 | 69.3 | 30.8 |
| 4 | 55.6 | 19.6 |
| 5 | 59.3 | 21.4 |
| 6 | 63.0 | 22.2 |
| 7 | 63.0 | 22.2 |
| 8 | 63.0 | 26.7 |
| Average | 66.2 | 26.5 |

EXAMPLE IV

Another portion of Catalyst A was tested in equipment similar to that described in Example II. This desulfurization test, Test No. 3, was conducted at a pressure of 300 psig, a temperature of 525° F. to 600° F., a WHSV of 3 to 6 weight units of hydrocarbon per hour per weight unit of catalyst, and a hydrogen rate of about 500 SCFB to about 1,000 SCFB. The results of this test are presented in accompanying FIG. 3. During the first 8 days on oil, the temperature was 525° F.; the WHSV, 3; and the hydrogen rate, about 500 SCFB. This period of operation is identified as Period 1. From 9 days on oil to 31 days on oil, the temperature was 555° F.; the

Table III

| Catalyst | Days on Oil | Pressure, psig | Temp., °F. | WHSV | H₂, SCFB | Desulfurization, wt. % | Olefin Saturation, wt. % | Δ Octane No., unleaded motor |
|---|---|---|---|---|---|---|---|---|
| | | | | | TEST NO. 1 | | | |
| A | 6 | 150 | 575 | 3 | 500 | 88.9 | 34.7 | −0.6 |
| A | 20 | 150 | 575 | 3 | 500 | 81.9 | 22.7 | +0.6 |
| A | 35 | 150 | 575 | 3 | 500 | 73.3 | 18.2 | +1.0 |
| A | 50 | 150 | 575 | 3 | 2,000 | 96.7 | 38.2 | −1.7 |
| A | 63 | 150 | 575 | 3 | 1,000 | 89.3 | 31.8 | −0.8 |
| A | 86 | 150 | 575 | 3 | 1,000 | 90.4 | 37.0 | −0.1 |
| | | | | | TEST NO. 2 | | | |
| B | 1 | 150 | 575 | 3 | 500 | 85.2 | 34.9 | −1.1 |
| B | 5 | 150 | 575 | 3 | 500 | 59.3 | 21.4 | +0.3 |
| | | | | | TEST NO. 3 | | | |
| A | 11* | 300 | 555 | 3 | 500 | 85.2 | 32.2 | −1.1 |
| A | 26* | 300 | 555 | 3 | 500 | 81.1 | 40.0 | −1.9 |
| A | 39 | 300 | 555 | 3 | 1,000 | 87.0 | 33.5 | 0 |
| A | 50 | 300 | 600 | 6 | 800 | 94.8 | 31.2 | −1.1 |

*NOT COMPLETE VAPORIZATION

EXAMPLE III

A commercial desulfurization catalyst, identified as HDS-2A and containing approximately 3 wt.% CoO and approximately 15 wt.% MoO₃, were obtained from the American Cyanamid Company. This catalyst comprised the metals deposed on a refractory inorganic oxide support of alumina. This catalyst is hereinafter identified as Catalyst B.

This Catalyst B was tested in a manner similar to that employed for Catalyst A. The results of this test, Test No. 2, are presented in accompanying FIG. 2 and are represented by the triangles. The resultant product sulfur concentration was substantially greater than that obtained with Catalyst A, showing poorer desulfurization.

Furthermore, for the first 8 days, an average desulfurization of 66.2 wt.% was obtained along with an olefin saturation of 26.5 wt.%. The pertinent individual values are presented in Table IV. Furthermore, additional data are shown in Table III.

WHSV, 3; and the hydrogen rate, about 500 SCFB. This period is identified as Period 2. From 31 days on oil to 45 days on oil, the temperature was 555° F.; the WHSV, 3; and the hydrogen rate was about 1,000 SCFB. This period of operation is identified as Period 3. From 45 days on oil to 63 days on oil, the temperature was 600° F., the WHSV, 6; and the hydrogen rate, 800 SCFB. This period is identified as Period 4.

Referring to FIG. 3, poor desulfurization was obtained in Period 1. Apparently, the temperature was too low and some liquid was present. In Period 2, an increased temperature provided more vaporization, but not complete vaporization. In Period 3, a higher hydrogen rate was employed. It is believed that substantially complete vaporization occurred. The points marked by "a" resulted from an upset due to low or no hydrogen flow. In Period 4, a different combination of operating condition values was used. The hydrogen flow rate was reduced to about 800 SCFB, while both the temperature and WHSV were increased. Substantially complete vaporization occurred.

Test No. 3 demonstrates that the process of the present invention performs satisfactorily at a pressure of 300 psig, performance is improved by greater vaporization of the reactants and products in the reaction zone, peak performance can be attained by the proper selection of operating conditions, and activity maintenance is excellent over an extended period of time.

Typical data obtained during Test No. 3 are presented in Table III hereinabove.

Figure 4:
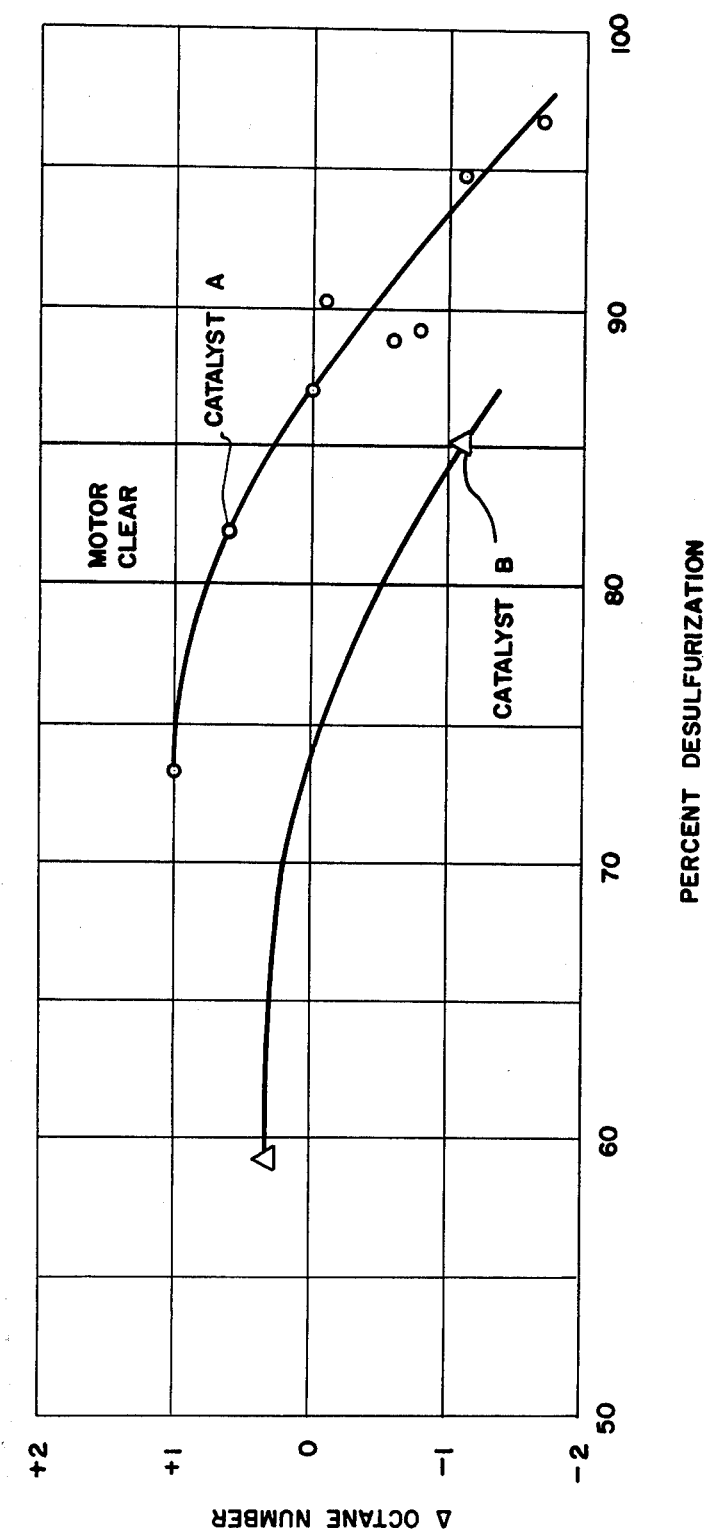
FIG. 4 shows the variation of Δ octane number with weight percent desulfurization obtained with two catalysts, one of which is the catalyst employed in the process of the present invention.

The variation of Δ octane number with weight percent desulfurization is presented in accompanying FIG. 4. These data were taken from the data presented in Table III and demonstrate that the loss in octane number obtained with Catalyst A, an embodiment of the catalyst employed in the process of the present invention, is less than the loss in octane number resulting from desulfurization with a typical commercial desulfurization catalyst, Catalyst B.

EXAMPLE V

Four additional catalysts were prepared. Three of these four are embodiments of the catalyst of the present invention and are identified hereinafter as Catalyst C, Catalyst D, and Catalyst E. Each of these three catalysts contained a catalytic support that comprises magnesium oxide. The fourth catalyst, hereinafter identified as Catalyst F, contained a catalytic support of alumina.

For the preparation of Catalyst C, a 162-gram portion of heavy magnesium oxide powder obtained from the Mallinckrodt Chemical Company was impregnated with a solution that had been prepared by dissolving 38.8 grams of ammonium molybdate in 100 ml. of hot distilled water (about 160° F.) and 23.5 grams of cobaltous nitrate in 50 ml. of distilled water, followed by mixing the two solutions. The impregnated material was dried in air at 250° F. for three hours, ground to pass through a 25-mesh screen (U.S. Sieve Series), pelleted into ⅛-inch pellets (employing 5% Sterotex), calcined in air for 2 hours at a temperature of 450° F., and subsequently calcined in air for 3 hours at a temperature of 1,000° F. During the drying and calcination sequences, an air flow rate of about 1.5 cubic feet per hour was employed. Catalyst C was prepared to contain 3 wt.% cobalt oxide and 16 wt.% molybdenum trioxide, based on the weight of the catalytic composition. The catalytic support was made up of 100 wt.% magnesium oxide.

For the preparation of Catalyst D, a 142-gram portion of heavy magnesium oxide powder obtained from the Mallinckrodt Chemical Company was blended with an aqueous solution prepared by dissolving 38.8 grams of ammonium molybdate and 23.5 grams of cobaltous nitrate in 150 ml. of warm distilled water (approximately 160° F.). After the composite was thoroughly blended, the resulting blend was mixed with 224.7 grams of alumina sol containing about 9 wt.% alumina. The mixture was thoroughly blended, dried in air for 3 hours at a temperature of 250° F., ground to pass through a 25-mesh screen (U.S. Sieve Series), and pelleted into ⅛-inch pellets (employing 5% Sterotex). The pellets were calcined in air for 2 hours at a temperature of about 450° F., gradually increased to a temperature of 1,000° F., and then calcined in air for 3 hours at a temperature of 1,000° F. Catalyst D was prepared to contain 3 wt.% cobalt oxide, 16 wt.% molybdenum trioxide, 70 wt.% magnesium oxide, and 11 wt.% alumina, based on the weight of the catalyst.

For the preparation of Catalyst E, a 106.5-gram portion of heavy magnesium oxide powder obtained from Mallinckrodt Chemical Company was blended with an aqueous solution prepared by dissolving 38.8 grams of ammonium molybdate and 23.5 grams of cobaltous nitrate in 150 ml. of warm distilled water (approximately 160° F.). After the composite was thoroughly blended, the blend was mixed with 398.8 grams of alumina sol containing about 9 wt.% alumina. The mixture was thoroughly blended, dried in air for 3 hours at a temperature of 250° F., ground to pass through a 25-mesh screen (U.S. Sieve Series), and pelleted into ⅛-inch pellets (employing 5% Sterotex). The pellets were calcined in air for 2 hours at a temperature of 450° F., gradually increased to a temperature of 1,000° F., and calcined in air for 3 hours at a temperature of 1,000° F. Catalyst E was prepared to contain 3 wt.% cobalt oxide, 16 wt.% molybdenum trioxide, 58 wt.% magnesium oxide, and 23 wt.% alumina, based on the weight of the catalyst.

For the preparation of Catalyst F, 1,920 grams of an alumina sol (containing approximately 8.9 wt.% alumina) were blended with an aqueous solution that had been prepared by dissolving 38.6 grams of ammonium molybdate and 23.3 grams of cobaltous nitrate in 500 ml. of distilled water. The resulting mass was dried overnight in air at a temperature of about 275° F., blended with 4% Sterotex, dried for 2 hours in air at a temperature of 450° F., gradually increased to a temperature of 1,000° F., and then calcined in air at a temperature of 1,000° F. for 3 hours. Catalyst F was prepared to contain 3 wt.% cobalt oxide, 16 wt.% molybdenum trioxide, and 81 wt.% alumina, based on the weight of the catalyst.

EXAMPLE VI

Catalysts C, D, E, and F were tested for their abilities to desulfurize a high-sulfur catalytically cracked naphtha, hereinafter identified as Feedstock No. 2. The properties of this feedstock are presented in Table I. Each of the tests was conducted in a bench-scale test unit, as described hereinbefore in Example II. Each of the tests employed a down-flow reactor and once-through hydrogen. The collected product was cooled by wet ice.

For each test, a 13-gram portion of the particular catalyst, in the form of particles that would pass through a 12-mesh screen (U.S. Sieve Series) but would be retained on a 20-mesh screen, was charged to the reactor. The catalyst sample was presulfided with a mixture of 8 vol.% hydrogen sulfide in hydrogen for one hour at atmospheric pressure and a temperature of 565° F. The gas flow rate employed was 1 cubic foot per hour. Standard operating conditions for each of the tests included a total pressure of 150 psig, a temperature of 575° F., a hydrogen rate of 1,000 SCFB, and a WHSV of 2.5 to 3.0 pounds of hydrocarbon per hour per pound of catalyst. Each of the samples of the hydrotreated product that was collected for a two-hour period was washed with a cadmium sulfate solution to remove hydrogen sulfide. The products were analyzed for sulfur content and bromine number.

The results of the tests that were conducted in this example are presented in Table V.

Table V

Test Data

| Catalyst | Composition, wt.% | | | | Hours on Oil | WHSV | S, Wt. % | Brom. No. cg/g | Desulf., wt.% | Sat., wt.% |
| --- | --- | --- | --- | --- | --- | --- | --- | --- | --- | --- |
|  | CoO | MoO$_3$ | MgO | Al$_2$O$_3$ |  |  |  |  |  |  |
| C | 3 | 16 | 81 | — | 20 | 2.9 | 0.0123 | 37.3 | 93.7 | 50.0 |
| D | 3 | 16 | 70 | 11 | 20 | 3.0 | 0.0076 | 26.6 | 96.1 | 64.4 |
| E | 3 | 16 | 58 | 23 | 21 | 3.0 | 0.0050 | 22.1 | 97.5 | 70.4 |
| F | 3 | 16 | — | 81 | 17 | 2.9 | 0.0417 | 42.8 | 78.6 | 42.5 |
| F | 3 | 16 | — | 81 | 40 | 2.8 | 0.0692 | 54.1 | 64.6 | 27.5 |
| F | 3 | 16 | — | 81 | 64 | 2.5 | 0.0712 | 54.2 | 63.5 | 27.3 |

The support of Catalyst C was magnesium oxide; the support of Catalyst D, 86.4 wt.% magnesium oxide; the support of Catalyst E, 71.6 wt.% magnesium oxide; and the support of Catalyst F, 0 wt.% magnesium oxide.

The results of the tests employing Catalysts C, D, E, and F show that those catalysts which had a support comprising magnesium oxide, that is, embodiments of the catalyst of the present invention, were superior to Catalyst F, which had a support of only catalytically active alumina. In view of this, a catalyst containing a support of at least 70 wt.% magnesium oxide is a suitable catalyst for the process of the present invention. Preferably, the catalyst support should contain at least 86 wt.% magnesium oxide.

What is claimed is:

1. A process for the selective desulfurization of cracked naphthas, which process comprises contacting a cracked naphtha comprising paraffins, naphthenes, aromatics, and unsaturates in a reaction zone under hydrodesulfurization conditions and in the presence of hydrogen with a catalyst to furnish a product containing unsaturates and a reduced amount of sulfur, said catalyst comprising a Group VIB metal and a Group VIII metal deposed on a solid support comprising at least 70 wt.% magnesium oxide, and said Group VIB metal and said Group VIII metal being present as a member selected from the group consisting of (1) the elements, (2) their oxides, (3) their sulfides, and (4) mixtures thereof.

2. The process of claim 1 wherein said Group VIB metal of said catalyst is present in an amount of about 10 wt.% to about 20 wt.% and said Group VIII metal of said catalyst is present in an amount of about 1 wt.% to about 10 wt.%, each amount being based on the total weight of the catalyst and being calculated as the oxide of the respective metal.

3. The process of claim 1 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

4. The process of claim 1 wherein said support includes catalytically active alumina.

5. The process of claim 1 wherein said catalyst comprises a support consisting essentially of magnesium oxide.

6. The process of claim 2 wherein said Group VIB metal of said catalyst is molybdenum and said Group VIII metal is cobalt.

7. The process of claim 2 wherein said support includes catalytically active alumina.

8. The process of claim 3 wherein said hydrodesulfurization conditions are regulated so that total vaporization of reactants and products is present in said reaction zone.

9. The process of claim 3 wherein the hydrogen partial pressure is at least 60 psia.

10. The process of claim 5 wherein said Group VIB metal of said catalyst is present in an amount of about 10 wt.% to about 20 wt.% and said Group VIII metal of said catalyst is present in an amount of about 1 wt.% to about 10 wt.%, each amount being based on the total weight of the catalyst and being calculated as the oxide of the respective metal.

11. The process of claim 6 wherein said support includes catalytically active alumina.

12. The process of claim 8 wherein the hydrogen partial pressure is at least 60 psia.

13. The process of claim 10 wherein said Group VIB metal of said catalyst is molybdenum and said Group VIII metal is cobalt.

14. The process of claim 11 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

15. The process of claim 11 wherein said support comprises alumina and at least 86 wt.% magnesium oxide, based on the weight of said support.

16. The process of claim 14 wherein said hydrodesulfurization conditions are regulated so that total vaporization of reactants and products is present in said reaction zone.

17. A process for the selective desulfurization of cracked naphthas, which process consists essentially of contacting a cracked naphtha comprising paraffins, naphthenes, aromatics, and unsaturates in a reaction zone under hydrodesulfurization conditions and in the presence of hydrogen with a catalyst to furnish a product containing unsaturates and a reduced amount of sulfur, said catalyst comprising a Group VIB metal and a Group VIII metal deposed on a solid support comprising catalytically active alumina and at least 70 wt.% magnesium oxide, based on the weight of said support, and said Group VIB metal and said Group VIII metal being present as a member selected from the group consisting of (1) the elements, (2) their oxides, (3) their sulfides, and (4) mixtures thereof.

18. The process of claim 17 wherein said Group VIB metal of said catalyst is present in an amount of about 10 wt.% to about 20 wt.% and said Group VIII metal of said catalyst is present in an amount of about 1 wt.% to about 10 wt.%, each amount being based on the total weight of the catalyst and being calculated as the oxide of the respective metal.

19. The process of claim 17 wherein said support comprises alumina and at least 86 wt.% magnesium oxide, based on the weight of said support.

20. The process of claim 17 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

21. The process of claim 18 wherein said Group VIB metal of said catalyst is molybdenum and said Group VIII metal is cobalt.

22. The process of claim 19 wherein said Group VIB metal of said catalyst is present in an amount of about 10 wt.% to about 20 wt.% and said Group VIII metal of said catalyst is present in an amount of about 1 wt.% to about 10 wt.%, each amount being based on the total weight of the catalyst and being calculated as the oxide of the respective metal.

23. The process of claim 21 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

24. The process of claim 22 wherein said Group VIB metal of said catalyst is molybdenum and said Group VIII metal is cobalt.

25. The process of claim 23 wherein said hydrodesulfurization conditions are regulated so that total vaporization of reactants and products is present is said reaction zone.

26. The process of claim 23 wherein the hydrogen partial pressure is at least 60 psia.

27. The process of claim 24 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

28. The process of claim 25 wherein the hydrogen partial pressure is at least 60 psia.

29. The process of claim 25 wherein the hydrogen partial pressure is at least 80 psia.

30. The process of claim 27 wherein said hydrodesulfurization conditions are regulated so that total vaporization of reactants and products is present in said reaction zone.

31. The process of claim 27 wherein the hydrogen partial pressure is at least 60 psia.

32. The process of claim 30 wherein the hydrogen partial pressure is at least 60 psia.

33. The process of claim 30 wherein the hydrogen partial pressure is at least 80 psia.

34. The process of claim 13 wherein said hydrodesulfurization conditions comprise a temperature of about 450° F. to about 750° F., a total pressure of about 75 psig to about 600 psig, a hydrogen-to-hydrocarbon ratio of about 200 SCFB to about 5,000 SCFB, and a WHSV of about 1 to about 15 weight units of hydrocarbon per hour per weight unit of catalyst.

35. The process of claim 34 wherein said hydrodesulfurization conditions are regulated so that total vaporization of reactants and products is present in said reaction zone.

* * * * *